US012492100B2

(12) United States Patent
Studer

(10) Patent No.: US 12,492,100 B2

(45) Date of Patent: Dec. 9, 2025

(54) DETERMINATION OF THE POSITION OF AN ELEVATOR CAR IN AN ELEVATOR SHAFT

(71) Applicant: INVENTIO AG, Hergiswil (CH)

(72) Inventor: Christian Studer, Kriens (CH)

( * ) Notice: Subject to any disclaimer, the term of this patent is extended or adjusted under 35 U.S.C. 154(b) by 1232 days.

(21) Appl. No.: 17/332,294

(22) PCT Filed: Nov. 22, 2019

(86) PCT No.: PCT/EP2019/082183

§ 371 (c)(1),
(2) Date: May 27, 2021

(87) PCT Pub. No.: WO2020/109151

PCT Pub. Date: Jun. 4, 2020

(65) Prior Publication Data

US 2022/0098004 A1 Mar. 31, 2022

(30) Foreign Application Priority Data

Nov. 27, 2018 (EP) .................................... 18208556

(51) Int. Cl.
*B66B 1/34* (2006.01)

(52) U.S. Cl.
CPC .......... *B66B 1/3492* (2013.01); *B66B 1/3423* (2013.01); *B66B 1/3446* (2013.01)

(58) Field of Classification Search
CPC ............................ B66B 1/3492; B66B 1/3446
USPC .......................................................... 187/394
See application file for complete search history.

(56) References Cited

U.S. PATENT DOCUMENTS 5,223,680 A * 6/1993 Schmidt-Milkau .......................... B66B 1/3492 187/394
2004/0195048 A1* 10/2004 Schonauer ............ B66B 1/3492 187/394
2010/0320036 A1* 12/2010 Ferreira ................ B66B 1/3492 187/394

(Continued)

FOREIGN PATENT DOCUMENTS

CN 1410335 A 4/2003
CN 105540369 A 5/2016
CN 108002165 A 5/2018

(Continued)

*Primary Examiner* — Erick D Glass

(74) *Attorney, Agent, or Firm* — Schlee IP International, PC; Alexander R. Schlee; Pascal A. Schlee

(57) ABSTRACT

In an elevator system, a measurement system is provided in addition to an elevator car, an elevator controller and a transferring device configured to transfer electrical energy and/or information between the elevator car and the elevator controller. The measurement system has a transmitting device and a detection device which can be positioned separate and remote from the transmitting device by an air path. The detection device receives a measurement signal emitted from the transmitting device as electromagnetic radiation via the air path and converts it into an electrical signal. The transmitting device receives the electrical signal via the transferring device, determines a propagation time of the measurement signal over the air path by means of the electrical signal, and determines a distance (d) between the transmitting device and the elevator car by means of the propagation time.

15 Claims, 2 Drawing Sheets

(56) References Cited

U.S. PATENT DOCUMENTS

| | | | | |
|---|---|---|---|---|
| 2013/0048434 | A1* | 2/2013 | De Coi | B66B 1/3492 187/325 |
| 2024/0174484 | A1* | 5/2024 | Wenlin | B66B 5/0037 |

FOREIGN PATENT DOCUMENTS

| | | | |
|---|---|---|---|
| CN | 108275528 | A | 7/2018 |
| CN | 108408516 | A | 8/2018 |
| DE | 10126585 | A1 | 5/2002 |
| DE | 202012012418 | U1 | 1/2013 |
| DE | 102012223689 | B3 | 1/2014 |
| EP | 0173087 | A1 | 3/1986 |
| EP | 0173087 | B1 | 5/1989 |
| ES | 2311388 | A1 | 2/2009 |
| GB | 2211046 | A | 6/1989 |
| JP | 2005047659 | A | 2/2005 |
| KR | 20150003476 | U | 9/2015 |
| WO | 2008077980 | A1 | 7/2008 |

* cited by examiner

DETERMINATION OF THE POSITION OF AN ELEVATOR CAR IN AN ELEVATOR SHAFT

CROSS-REFERENCE TO RELATED APPLICATIONS

This application is the national phase application under 35 U.S.C. § 371 claiming the benefit of priority based on International Patent Application No. PCT/EP2019/082183, filed on Nov. 22, 2019, which claims the benefit of priority based on European Patent Application No. 18208556.3 filed on Nov. 27, 2018. The contents of each of these applications are hereby incorporated by reference in their entirety.

FIELD OF THE INVENTION

The technology described herein relates generally to an elevator system. Exemplary embodiments of the technology relate in particular to a system for determining a position of a movable elevator car and an elevator system comprising such a system. Exemplary embodiments of the technology also relate to a method for determining a position of an elevator car in an elevator system.

BACKGROUND OF THE INVENTION

DE 10126585A1 discloses a position reference system for an elevator car of an elevator system. The position reference system has a sensor with a laser that emits a beam that is reflected by a mirror. The reflected beam is detected by a detector in the sensor. Either the laser or the mirror is mounted in a stationary position, while the respective other device is attached to and moves with the elevator car. The laser beam is modulated at two frequencies, a higher one and a lower one. The lower frequency provides a rough position of the elevator car, while the higher frequency provides a fine position of the elevator car. A position calibration is performed when the elevator car is stationary to determine an initial position of the elevator car. When the elevator car begins to move, the rough position is determined using the lower frequency, while the fine position is determined using the higher frequencies. In this way, an absolute position of the moving elevator car relative to the initial position can be determined.

The accuracy of such a laser-based position reference system depends on the quality of the reflected laser beam hitting the detector. Although a laser beam is highly focused and has a high intensity, it is subject to atmospheric distortions. Temperature variations along the vertical in an elevator shaft (especially in tall buildings), air movement, humidity, and dust can negatively affect the quality of the reflected laser beam because, under certain circumstances, the intensity of the laser beam hitting the detector can be very low. A determination of the distance therefore depends on such influences, making an accurate determination of the absolute position uncertain. There is therefore a need for an improved technology for determining the position of an elevator car.

SUMMARY OF THE INVENTION

One aspect of the technology described herein relates to an elevator system comprising an elevator car, an elevator controller, a transferring device, a transmitting device, a detection device and a processing device. The elevator controller is configured to control a movement of the elevator car along a travel path in a building. The transferring device is configured to transfer electrical energy and/or information between the elevator car and the elevator controller. The transmitting device is configured to transmit a measurement signal as electromagnetic radiation via an air path. The detection device is arranged in the direction of the air path remote from and opposite to the transmitting device. The detection device is configured to directly receive the measurement signal via the air path and to convert it into an electrical signal. The processing device is configured to determine a propagation time of the measurement signal along the air path by means of the electrical signal and to determine a distance between the transmitting device and the detecting device by means of the propagation time. The processing device is also configured to determine a position of the elevator car by means of the distance.

Another aspect of the technology described herein relates to a measurement system for such an elevator system. The measurement system comprises a transmitting device, a detecting device, and a processing device. The transmitting device is configured to transmit a measurement signal as electromagnetic radiation via an air path. The detection device is positionable in the direction of the air path remote from and opposite to the transmitting device. The detection device is configured to receive the measurement signal directly via the air path and to convert it into an electrical signal. The processing device is configured to determine a propagation time of the measurement signal along the air path by means of the electrical signal and to determine a distance between the transmitting device and the detecting device by means of the propagation time. The processing device is also configured to determine a position of the elevator car by means of the distance.

Another aspect of the technology described herein relates to a method for determining a distance in an elevator system having an elevator car, an elevator controller, a transferring device that transfers electrical energy and/or information between the elevator car and the elevator controller, a transmitting device, a detection device separated and remotely positioned from the transmitting device by an air path, and a processing device. According to the method, the transmitting device is activated to emit a measurement signal as electromagnetic radiation, and the detection device is operated to convert the electromagnetic radiation into an electrical signal, the electromagnetic radiation propagating in a direct air path from the transmitting device to the detection device. The processing device is operated to determine a propagation time of the measurement signal over the air path by means of the received electrical signal and to determine a distance between the transmitting device and the detection device by means of the propagation time. A position of the elevator car is determined by means of the distance.

The technology described here makes it possible in an elevator system to determine the distance, which depends to a reduced extent on external influences. This is made possible by the fact that the measurement signal passes through the air path only once, namely on its way from the transmitting device to the detection device. For this purpose, the detection device is arranged in the direction of the air path remote from and opposite to the transmitting device. The arrangement is selected such that there is a "line of sight" between the transmitting device and the detection device, i.e. an exemplary optical beam can hit the detection device unimpeded.

The technology described herein can be applied to an elevator system with relatively little effort. In one exemplary embodiment, the transferring device is additionally used as a communication channel, which eliminates the need to install an additional communication channel. As a result, it is also possible to equip an elevator system that has already been installed and put into operation in a building with the technology described herein with relatively little effort, for example as part of an elevator modernization project.

The additional use of the transferring device as a communication channel is in particular also an advantage because the transmitting device and the detection device are arranged at a distance from one another; depending on whether a signal is to be available on the side of the transmitting device or on the side of the detection device, it can be transferred via the transferring device. This provides flexibility with respect to the spatial arrangement of the devices; for example, determining the distance can be made on the side of the transmitting device or on the side of the detection device.

In one exemplary embodiment, the transferring device comprises a traveling cable attached to the elevator car and to or near the elevator controller. The traveling cable has a fixed and constant length which, in one exemplary embodiment, can be used to determine the propagation time.

In the technology described herein, the distance can be determined in a variety of ways. In a first exemplary embodiment, the processing device is arranged at the transmitting device and coupled to the transferring device by a first interface device to receive the electrical signal via the transferring device. The transferring device, for example in the form of a traveling cable, thus closes a loop from the transmitting device via the air path to the detection device and from there to the processing device arranged at the transmitting device. The possible atmospheric influences mentioned above thus affect the measurement signal only on the air path.

In this first exemplary embodiment, the processing device is configured to determine the propagation time from a difference between a second time at which the processing device receives the electrical signal and a first time at which the transmitting device transmits the measurement signal. Thus, transmitting the measurement signal by the transmitting device and determining the distance by the processing device takes place (with respect to the transferring device) on the same side. The transmitting device and the processing device can therefore be arranged, for example, on a common circuit board; this reduces, for example, the circuitry and the space required.

In one configuration of the first exemplary embodiment, the processing device and the transmitting device are temporally synchronized with respect to each other. That is, the processing device and the transmitting device have a common time reference ("clock"). The electrical signal received by the processing device at the second time can therefore be unambiguously associated with the measurement signal transmitted by the transmitting device at the first time in order to determine the propagation time.

In a second exemplary embodiment, the processing device is arranged at the detection device and is coupled to the transferring device by a second interface device. In addition, the transmitting device is configured to transmit the measurement signal as an electrical measurement signal to the processing device via the transferring device. The transferring device, for example in the form of a traveling cable, thus virtually represents a communication channel parallel to the air path. The processing device thus receives the electrical signal from the detection device and the electrical measurement signal via the transferring device.

In this second exemplary embodiment, the processing device is configured to determine the propagation time from a difference between a second time at which the detection device receives the measurement signal via the air path and a third time at which the processing device receives the electrical measurement signal via the transferring device. Thus, generating the electrical signal, receiving the electrical measurement signal, and determining the distance by means of the processing device takes place on the same side (with respect to the transferring device). The detection device and the processing device may therefore be arranged, for example, on a common circuit board; this reduces, e.g., the circuitry and the space required.

In one configuration of the second exemplary embodiment, the processing device and the detection device are temporally synchronized with respect to each other, i.e. they have a common time reference. Therefore, the electrical signal received at the second time by the processing device can be unambiguously associated with the electrical measurement signal received at the third time by the processing device to thereby determine the propagation time.

In a third exemplary embodiment, the processing device is arranged at the detection device and coupled to the transferring device by the second interface device. In this respect, the arrangement is similar to that of the second exemplary embodiment. In the third exemplary embodiment, the transferring device is used to temporally synchronize the processing device and the transmitting device.

In this third exemplary embodiment, the processing device is configured to determine the propagation time from a difference between a second time at which the processing device receives the electrical signal and a first time at which the transmitting device transmits the measurement signal. Since the processing device and the transmitting device have a common time reference, the electrical signal received by the processing device at the second time can be unambiguously associated with the measurement signal transmitted by the transmitting device at the first time to thereby determine the propagation time.

In the aforementioned exemplary embodiments, one or more interface devices are used. If the transferring device comprises a traveling cable, this is already coupled to the elevator car and the elevator controller, or to the power supply, by interface devices of the elevator system. The additional effort for coupling according to the exemplary embodiments described herein is therefore low.

In one exemplary embodiment of the technology described herein, low-cost and commonly available components are used. This also contributes to the fact that the technology can be implemented with relatively little effort. These components include, for example, an electro-optical converter and an opto-electrical converter. The electro-optical converter can comprise, for example, an LED unit, laser unit or laser diode unit, and the opto-electrical converter may include, for example, a PIN diode unit.

The technology described herein also provides flexibility for use in the elevator system. In one exemplary embodiment, the transmitting device is arranged (stationarily) at a fixed location in an elevator shaft, while the detection device is arranged on the elevator car (and thus movably). In contrast, in another exemplary embodiment, the detection device is arranged at a fixed location in the elevator shaft (stationarily), while the transmitting device is arranged on the elevator car (and thus movably).

BRIEF DESCRIPTION OF THE DRAWINGS

In the following, various aspects of the improved technology are explained in more detail by means of exemplary embodiments in connection with the figures. All figures are merely schematic illustrations of methods and devices or their components according to exemplary embodiments of the improved technology. In particular, distances and size relations are not reproduced to scale in the figures. In the figures, identical elements have identical reference signs. In the figures.

DETAILED DESCRIPTION OF EMBODIMENTS OF THE INVENTION

Figure 1:
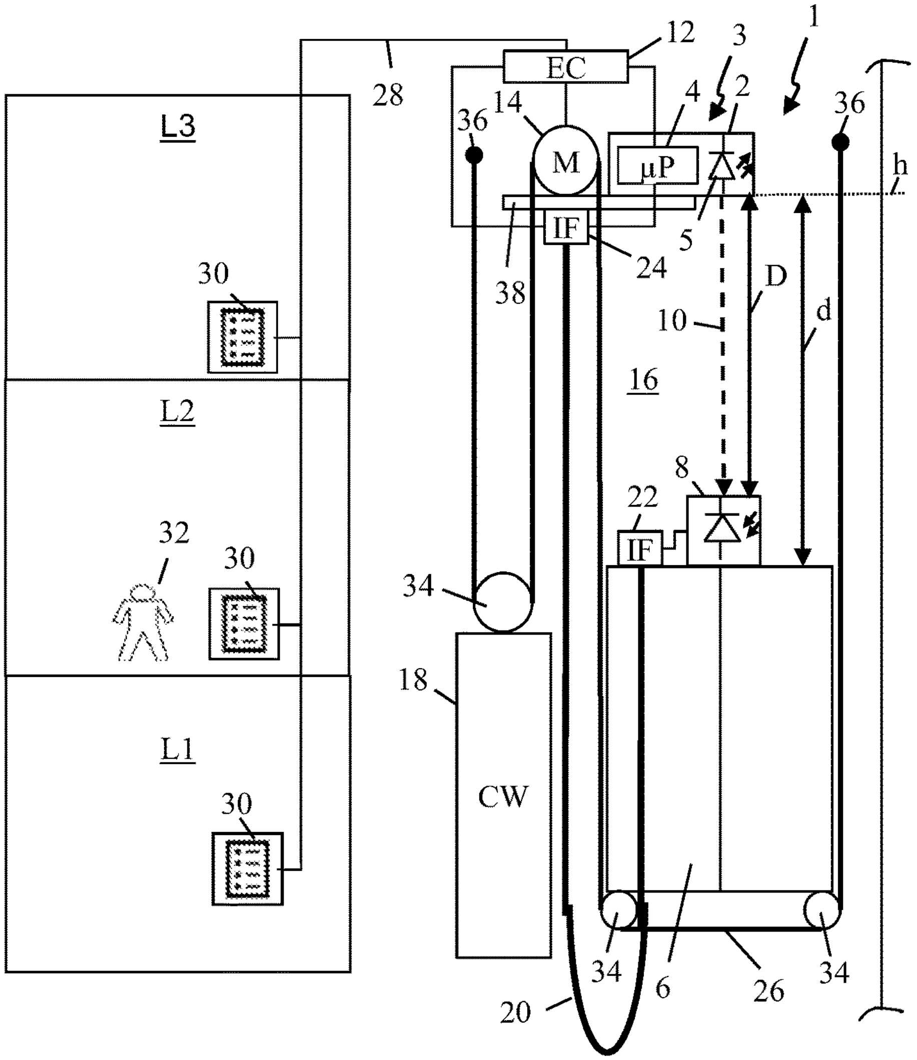
FIG. 1 shows a schematic illustration of an exemplary elevator system with a system for determining a position of an elevator car.

FIG. 1 shows a schematic illustration of an exemplary embodiment of an elevator system 1 in a building, wherein the elevator system 1 is equipped with a system for determining a position of an elevator car 6. The building can in principle be any type of multi-story building (e.g. residential building, hotel, office building, sports station, etc.). The elevator system 1 can also be installed on a ship. In the following, components and functions of the elevator system 1 are explained as far as they seem helpful for an understanding of the technology described herein. The building shown in FIG. 1 has a plurality of floors L1, L2, L3 served by the elevator system 1, i.e., a passenger 32 can be transported from an entry floor to a destination floor by the elevator system 1 after inputting a call at a call input terminal 30.

In the exemplary embodiment shown, the elevator car 6 is movable along a travel path in the building. For example, the travel path extends along a vertical elevator shaft 16. In another exemplary embodiment, the travel path may extend along a horizontal or inclined plane. In yet another exemplary embodiment, the travel path may have vertical and horizontal sections. In the following, the description of the technology disclosed herein is based on the exemplary elevator system 1 shown in FIG. 1.

The elevator system 1 shown in FIG. 1 also comprises an elevator controller (EC) 12, a drive machine (M) 14, a counterweight (CW) 18, a transferring device 20, a suspension means 26 (one or more steel ropes or flat belts) and a plurality of deflection pulleys 34. The suspension means 26 has two ends, each end being attached to a fixed point 36 in the elevator shaft 16. Between the fixed points 36, the suspension means 26 partially wraps around the deflection pulley 34 on the counterweight 18, a traction sheave of the drive machine 14 and the deflection pulleys 34 on the elevator car 6. The elevator system 1 shown is thus a traction elevator, wherein further details, such as guide rails for the elevator car 6 and guide rails for the counterweight 18, are not shown in FIG. 1. The elevator controller 12 is connected to and controls the drive machine 14 to move the elevator car 6 in the shaft 16. The function of a traction elevator, its components and the tasks of an elevator controller 12 are generally known to the person skilled in the art. The person skilled in the art will recognize that the elevator system 1 can comprise a plurality of elevator cars 6 or multi-deck cars in one or more elevator shafts 16, or can comprise one or more groups of elevators controlled by a group controller.

The elevator system 1 further comprises a measurement system 3 configured to determine a position of the elevator car 6 along the travel path in the elevator shaft 16. The measurement system 3 comprises a transmitting device 2 comprising a radiation source 5 for electromagnetic radiation, and a processing device (μP) 4. The measurement system 3 further comprises a detection device 8 designed for receiving electromagnetic radiation. Further details of exemplary embodiments of the measurement system 3 are given in connection with FIG. 2, FIG. 3 and FIG. 4.

For position determination according to the technology described herein, the detection device 8 is spatially separated by an air path D and arranged remotely from the transmitting device 2 or the radiation source 5 thereof. In the exemplary embodiment according to FIG. 1, the transmitting device 2 with the radiation source 5 and the processing device 4 are arranged at a fixed (stationary) location in the elevator shaft 16. The detection device 8, on the other hand, is arranged on the elevator car 6 and is moved therewith in the elevator shaft 16, for example when the elevator car 6 is moved to handle an elevator call. The person skilled in the art will recognize that in another exemplary embodiment, a reverse arrangement can be provided, i.e., the transmitting device 2, or at least the radiation source 5, is arranged on and movable with the elevator car 6, while the detection device 8 is arranged at a fixed (stationary) location in the elevator shaft 16.

The person skilled in the art will also recognize that in the exemplary embodiment shown in FIG. 1, the processing device 4 can be arranged separate and remote from the radiation source 5; its function, for example, can be integrated in the elevator control 12. The person skilled in the art will also recognize that, depending on the exemplary embodiment, the processing device 4 can furthermore be configured for, in addition to a processing function, other functions, for example a control function and/or a synchronization function. For this purpose, the processing device 4 comprises a processor unit which is appropriately configured, for example programmed, for the intended function.

The transmitting device 2 can be arranged in the elevator shaft 16, e.g., by means of a mount 38; the mount 38 may be arranged on or near the drive machine 14, as indicated in FIG. 1. The transmitting device 2 and the processing device 4 can be arranged on a common printed circuit board (PCB) and/or in a common housing. With respect to the vertical direction (i.e., in height), the arrangement of the transmitting device 2 is selected such that the position determination between a lower maximum position of the elevator car 6 (i.e., the elevator car 6 is at the lowest floor, at the lowest travel position, or in a so-called shaft pit) and an upper maximum position of the elevator car 6 (i.e., the elevator car 6 is at the uppermost floor, at the uppermost travel position, or in or near a so-called shaft head) is ensured.

The radiation source 5 and the detection device 8 are aligned with respect to each other in such a manner that there is “line of sight” between them and the emitted electromagnetic radiation can hit the detection device 8 unhindered. In FIG. 1, the emitted electromagnetic radiation is shown as a beam 10 pointing in the direction of the elevator car 6. In an exemplary embodiment, a laser unit generates the electromagnetic radiation, as described, for example, in connection with FIG. 2; the beam 10 is therefore also referred to as laser beam 10.

In FIG. 1, it can be seen that the technology described here makes it possible to determine the distance, which depends to a reduced extent on external influences. This is made possible due to the fact that the beam 10 resulting from an electrical measurement signal passes through the air path D only once, namely on the outward path from the transmitting device 2 to the detection device 8. According to the exemplary embodiment shown in FIG. 1, the transferring device 20 closes a signal path from the transmitting device 2 via the air path D to the detection device 8 and from there to the evaluation device 4, which in FIG. 1 is arranged on the side of the transmitting device 2. Any atmospheric influences thus affect the beam 10 only on the air path D. In the exemplary embodiments shown in FIG. 2, FIG. 3 and FIG. 4, the beam 10 also passes through the air path D only once.

In one exemplary embodiment, the transferring device 20 comprises an electric cable provided, for example, in a traction elevator (or other types of elevators) for transferring electric energy and electric signals and extending between the elevator car 6 and a fixed point to which the elevator controller 12 is coupled and having a fixed and constant length. For this purpose, the electric cable has electric power and signal lines. For example, the electric cable supplies electrical power to the elevator car 6 and transmits signals (e.g., load, status, and/or car call information) to and from the elevator car 6. The electric cable is also known to a person skilled in the art as a (flat) traveling cable, and hereinafter the transferring device 20 is also referred to as a traveling cable 20. The person skilled in the art is therefore familiar with devices (e.g., interface devices) that couple the traveling cable 20 to the elevator controller 12 and its power/voltage supply, on the one hand, and to the elevator car 6 and its electric and electronic components, on the other hand. In another exemplary embodiment, the transferring device 20 can comprise one or more bus bars.

In one exemplary embodiment, the elevator system 1 shown in FIG. 1 further comprises interface devices (IF) 22, 24; the interface device 22 provides an electrical connection between the detection device 8 and the traveling cable 20, and the interface device 24 provides an electrical connection between the transmitting device 2 and the traveling cable 20. Depending on the configuration, the processing device 4 is also coupled to one of the interface devices 22, 24. In FIG. 1, the interface device 24 is also connected to the elevator controller 12. The interface devices 22, 24 enable electrical signals to be input to and output from (decoupled from) the traveling cable 20. The person skilled in the art will recognize that the interface devices 22, 24 can be associated with the elevator system 1, the transferring device 20 or the measurement system 3 (i.e., with the transmitting device 2 or the detection device 8).

Figure 2:
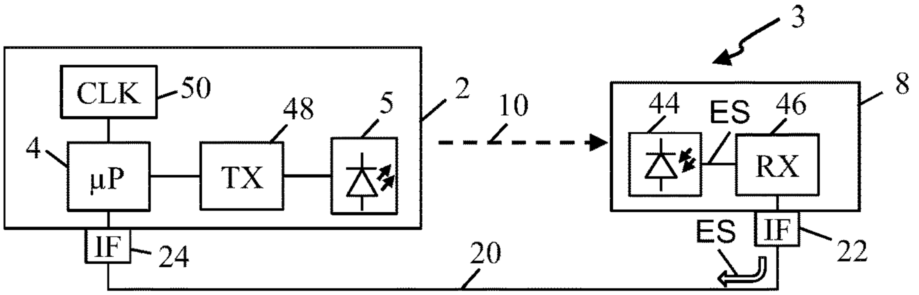
FIG. 2 shows a schematic block diagram of a first exemplary embodiment of a system for determining a position of an elevator car.

FIG. 2 shows a schematic block diagram of a first exemplary embodiment of the measurement system 3 with the transmitting device 2 and the detection device 8. FIG. 2 also shows the transferring device 20, which connects the transmitting device 2 and the detection device 8 to one another via the interface devices 22, 24. The person skilled in the art will recognize that the transferring device 20 is additionally connected to other components of the elevator system 1, for example to the elevator control 12. For illustration purposes, the (laser) beam 10 is also plotted.

In FIG. 2, as an example, the processing device 4 is associated with the transmitting device 2 and connected to the interface device 24. In addition to the radiation source 5, the transmitting device 2 comprises a control device (TX) 48 for the radiation source 5 and a timing or clock device (CLK) 50. The detection device 8 comprises a detector unit 44 and a control device (RX) 46 which is connected to the interface device 22.

In one exemplary embodiment, the measurement system 3 is an optical measurement system, i.e., the radiation emitted from the radiation source 5 is in a frequency range that includes the light spectrum and can be perceived by humans as visible light. The detection device 8 is configured accordingly for this light spectrum. For this purpose, the radiation source 5 comprises, e.g., an LED unit, laser unit or laser diode unit. Such a radiation source 5 emits red light, for example, and in one exemplary embodiment is designed as a laser diode unit. Such a laser diode unit can be compact and space-saving; in addition, the red light facilitates an adjustment of the radiation source 5 and the detector 44.

The control device 48 comprises, for example, a (laser) driver circuit which activates the radiation source 5 in accordance with an electrical measurement signal. The radiation source 5, as an electro-optical converter, converts the electrical measurement signal into a light signal (laser beam 10), the properties of which (intensity, (pulse) frequency and/or modulation type) can be specified by the supplied electrical measurement signal. The clock device 50 and the processing device 4 can in turn specify the electrical measurement signal.

The detector 44 of the detection device 8, as an opto-electrical converter, converts the received laser beam 10 into an electrical signal ES which is supplied to the receiving device 46. The detector 44 comprises photosensitive components, for example, "charge-coupled device" (CCD) components, "complementary metal-oxide-semiconductor pixels (CMOS pixels), avalanche photodiodes (APDs), or "positive-intrinsic-negative diodes" (PIN diodes). These components can be arranged and interconnected such that the detector 44 has a photosensitive detection area of desired size. The size of the detection area is selected such that the laser beam 10 hits the detector 44 even at greater distances d, deviations and vibrations of the elevator car 6.

For example, the receiving device 46 controls the detector 44 to specify the operating parameters thereof (e.g., an operating point) and processes the electrical signal ES for transmission via the transferring device 20 (e.g., by amplification and signal shaping). For example, if the laser beam 10 contains a sequence of light impulses, i.e., a light pulse, the electrical signal ES correspondingly contains a sequence of electrical pulses.

In the technology described herein for determining the position of the elevator car 6 in the elevator shaft 16, a propagation time measurement is used. A temporally short light pulse emitted by the radiation source 5 needs a certain propagation time t for the air path from the radiation source 5 to the detector 44. By determining this propagation time t, the distance d between the radiation source 5 and the detector 44 can be determined for a given speed of light (c 300.000 km/s in air), i.e., $d=c\cdot t$.

The distance d that can be determined in this way enables the position of the elevator car 6 to be determined. In the situation shown in FIG. 1, the location of the transmitting device 2 is a reference point from which the distance d is determined. In one exemplary embodiment, the reference point in the elevator shaft 16 has a predetermined and thus known height h, for example relative to a shaft floor or a first floor sill. At a certain time, the detection device 8 has the distance d to the transmitting device 2. The position of the detection device 8 arranged on the elevator car 6 (i.e., its height in the elevator shaft 16) results from the difference between the height h of the transmitting device 2 and the distance d. The position of the elevator car 6 can be derived from the position of the detection device 8. The position of the elevator car 6 determined in this way is also referred to as the absolute position. If the detection device 8 is arranged on the roof of the elevator car 6, for example, as shown in FIG. 1, the position of the car roof is thus known. Since a door sill of the elevator car 6 or a car floor have known distances from the car roof, the positions of the door sill and the car floor can also be determined.

Various measuring methods can be used to determine the propagation time. The person skilled in the art will recognize that the measurement system 3 is configured according to the selected measuring method. In the first exemplary embodiment shown in FIG. 2, the processing device 4 is arranged at or in the transmitting device 2 and coupled to the transferring device 20 by the first interface device 24 to receive the electrical signal ES via the transferring device 20. In FIG. 2, the electrical signal ES is symbolically plotted as an arrow pointing in the direction of the transmitting device 2.

In this first exemplary embodiment, the processing device 4 is configured to determine the propagation time from a difference between a time $t_2$ at which the processing device 4 receives the electrical signal ES and a first time $t_1$ at which the transmitting device 2 transmits the measurement signal. Transmitting the measurement signal by the transmitting device 2 and the determination of the distance by the processing device 4 are thus performed on the same side (with respect to the transferring device 20). The transmitting device 2 and the processing device 4 are arranged on a common circuit board and have a common time reference predetermined by the clock device 50. This synchronization allows the electrical signal ES received at time $t_2$ by the processing device to be unambiguously associated with the measurement signal transmitted at time $t_1$ by the transmitting device 2 to determine the propagation time t: $t=t_2-t_1$ therewith.

The measured propagation time t is composed of the time $t_D$ needed by the light beam 10 for the air path D and the time $t_{20}$ needed by the electrical signal ES for the length of the traveling cable 20: $t=t_D+t_{20}$. The light beam 10 and the electrical signal ES propagate at the speed of light ($C_D$, $C_{20}$) known for the respective medium; moreover, the predetermined length $L_{20}$ of the traveling cable 20 is known. With the measured propagation time $t=t_D+t_{20}=d/C_D+L_{20}/C_{20}$, the distance d can be calculated with $d=C_D(t-L_{20}/C_{20})$.

Figure 3:
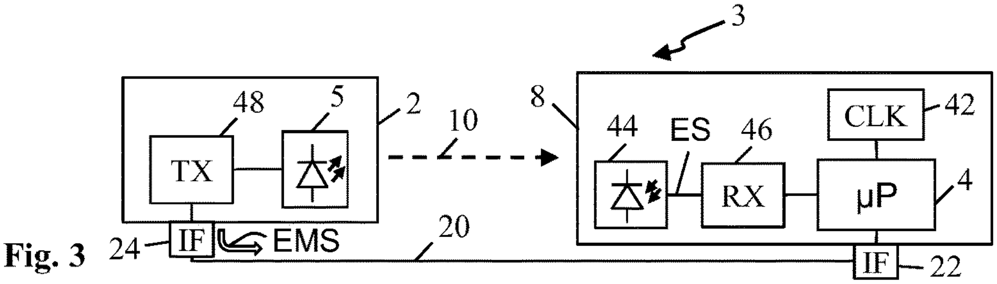
FIG. 3 shows a schematic block diagram of a second exemplary embodiment of a system for determining a position of an elevator car.

In the second exemplary embodiment shown in FIG. 3, the processing device 4 is arranged at or in the detection device 8 and coupled to the transferring device 20 by the interface device 22. Moreover, the transmitting device 2 is configured to transmit the measurement signal as an electrical measurement signal EMS to the processing device 4 via the transferring device 20. For this purpose, the control device 48 is not only connected to the radiation source 5 but is additionally coupled to the interface device 24 in order to feed the electrical measurement signal EMS into the transferring device 20. In FIG. 3, the electrical measurement signal EMS is symbolically plotted as an arrow pointing in the direction of the detection device 8. The transferring device 20, for example in the form of a traveling cable, thus virtually represents a communication channel parallel to the air path D. The processing device 4 thus receives the electrical signal from the detection device 8 and the electrical measurement signal EMS via the transferring device 20.

In this second exemplary embodiment, the processing device 4 is configured to determine the propagation time from a difference between a second time $t_2$ at which the detection device 8 receives the measurement signal via the air path D and a third time $t_3$ at which the processing device 4 receives the electrical measurement signal EMS via the transferring device 20. Thus, generating the electrical signal ES, receiving the electrical measurement signal EMS and determining the distance by means the processing device are performed on the same side (with respect to the transferring device 20). The detection device 8 and the processing device 4 can be arranged, for example, on a common circuit board.

In one configuration of the second exemplary embodiment, the processing device 4 and the detection device 8 are temporally synchronized with each other. The electrical signal ES received by the processing device 4 at the second time $t_2$ can therefore be unambiguously associated with the electrical measurement signal EMS received by the processing device at the third time $t_3$ in order to determine the propagation time therewith.

The electrical signal ES needs the time $t_{20}$ for the (known) length L of the traveling cable 20. If the time $t_3$ is measured, thus, the time $t_1$ can be determined (t1=t3−t20), at which the electrical measurement signal EMS and parallel to it the laser beam 10 were emitted. If the time $t_2$ is measured at which the electrical signal ES is received by the processing device 4, the propagation time $t_D$ results from the air path D with $t_D=t_2-t_1$ and the distance d with $d=C_D\cdot t_D$.

Figure 4:
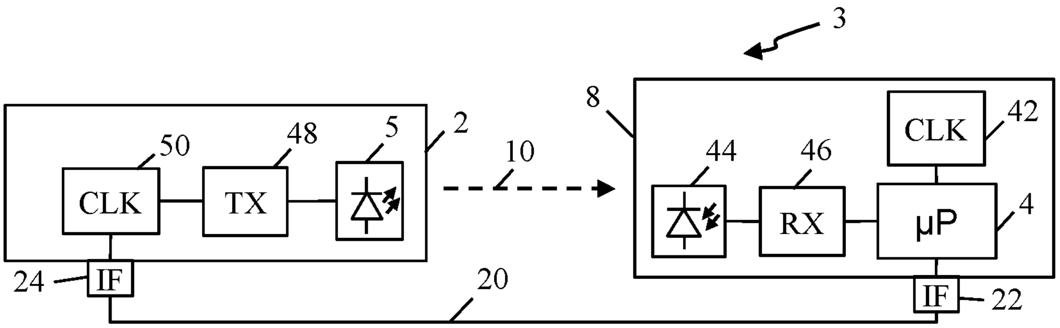
FIG. 4 shows a schematic block diagram of a third exemplary embodiment of a system for determining a position of an elevator car.

FIG. 4 shows a third exemplary embodiment. In this exemplary embodiment, the processing device 4 is arranged at the detection device 8 and coupled to the transferring device 20 by the interface device 22. In this respect, the arrangement is similar to that of the second exemplary embodiment shown in FIG. 3. In the third exemplary embodiment, the transferring device 20 is used to temporally synchronize the processing device 4 and the transmitting device 2.

In this third exemplary embodiment, the processing device 4 is configured to determine the propagation time from a difference between a second time $t_2$ at which the processing device 4 receives the electrical signal and a first time $t_1$ at which the transmitting device 2 transmits the measurement signal. Since the processing device 4 and the transmitting device 2 have a common time reference, the electrical signal received by the processing device 4 at the second time $t_2$ can be unambiguously associated with the measurement signal transmitted by the transmitting device 2 at the first time $t_1$ in order to determine the propagation time $t_D$ over the air path D. The distance d results from $d=C_D\cdot t_D$.

In one exemplary embodiment, the clock devices 42, 50 are synchronous with each other, i.e. they have a common time reference. In this manner, for example, a time of a laser pulse emitted by the transmitting device 2 can be compared with a time of its reception by the detection device 8 in order to determine the propagation time for the air path therefrom. Methods for synchronizing a transmitter and a receiver are generally known to the person skilled in the art. For synchronization, an oscillator in conjunction with a high frequency generator can be provided in one or each of the clock devices 42, 50. In FIG. 2, synchronization can be carried out, for example, by the transferring device 20.

In one exemplary embodiment, the measurement signal can be transmitted together with a time stamp. The time stamp indicates the time at which the measurement signal was transmitted. The propagation time results from the difference between the time of reception and the time of transmission.

Figure 5:
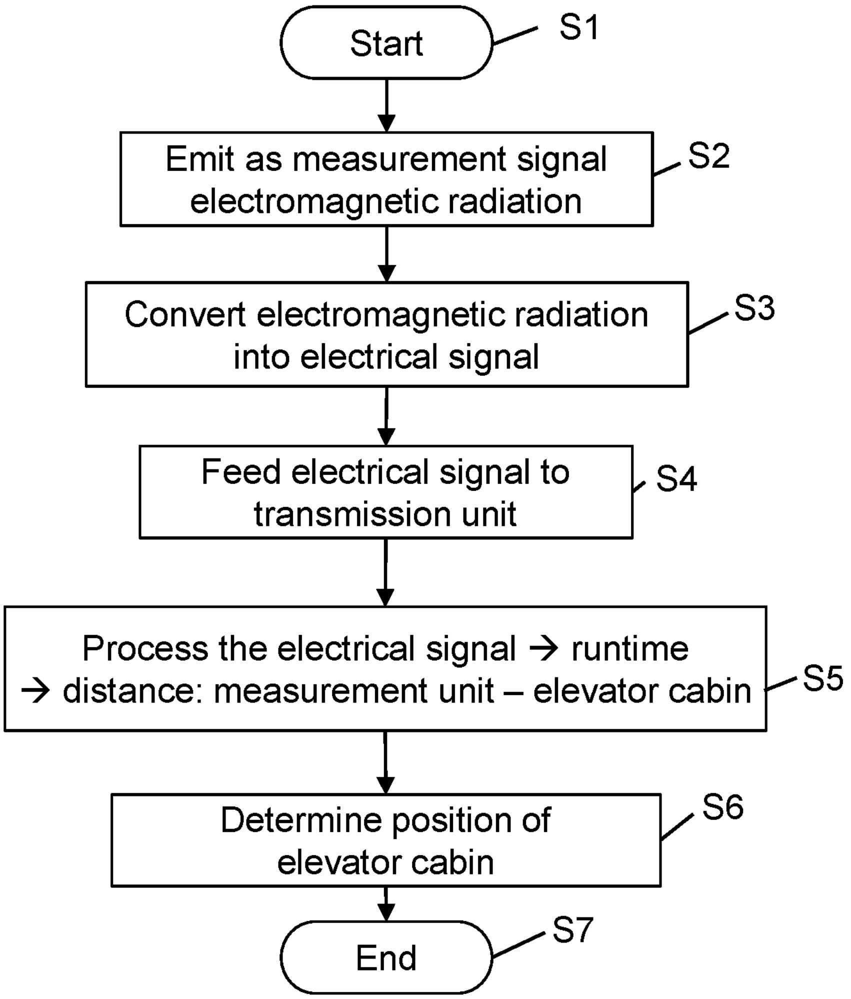
FIG. 5 shows an exemplary embodiment of a method for determining a distance in an elevator system.

With the understanding of the above-described principle system components and their functionalities, a description of an exemplary method for determining a distance in an elevator system 1 is given below in connection with FIG. 5. The description is given with reference to the exemplary embodiment of the elevator system 1 shown in FIG. 1, in which the transmitting device 2 is arranged stationarily in the elevator shaft 16, while the detection device 8 is arranged on the elevator car 6, for example on the car roof. The measurement system 3 is ready for operation, i.e. the transmitting device 2 and the detection device 8 are connected to the traveling cable 20 and adjusted with respect to each other in such a manner that the electromagnetic radiation hits the detection device 8 during the travel of the elevator car 6 and can be detected by the latter. The method starts in a step S1 and ends in a step S7.

In a step S2, a measurement signal is emitted as electromagnetic radiation by the transmitting device 2. In the exemplary embodiment considered here, the transmitting device comprises a laser unit (5) which emits a laser beam as electromagnetic radiation. The laser beam is preferably visible, e.g., as red light, when it is scattered by dust or hits a surface. In the following, reference will be made to this laser beam.

As explained above, the transmitting device 2 emits the laser beam according to the measuring method specified for the measurement system 3 for determining the propagation time. In an exemplary embodiment, this means that the transmitting device 2 and the detection device 8 or their clock devices 42, 50 are synchronous.

In a step S3, the electromagnetic radiation, i.e., the laser beam 10, is converted into an electrical signal ES by the detection device 8. From the transmitting device 2 to the detection device 8, the laser beam 10 propagates along the air path; for this air path, for example, a laser pulse propagating in air at the speed of light c≈300,000 km/s needs a certain time, referred to here as propagation time.

In a step S4, the electrical signal ES is fed into the transferring device 20 by the detection device 8, as indicated in FIG. 2. Feeding is performed by means of the interface device 22; extracting or decoupling the electrical signal from the transferring device 20 is carried out by means of the interface device 24 on the transmitting device 2 side.

In a step S5, the electrical signal received via the transferring device 20 is evaluated by the processing device 4. The processing device 4 determines a propagation time of the measurement signal over the air path by means of the electrical signal and determines a distance d between the transmitting device 2 and the elevator car 6 by means of the propagation time. Since the position of the transmitting device 2 is known, e.g., its height in the elevator shaft 16, the height of the detection device 8 can be determined therefrom. Based on the height of the detection device 8 which is arranged at known distances from parts of the elevator car 6, e.g. a door sill or door header, the position of the elevator car 6 in the elevator shaft 16 can be determined therefrom.

The invention claimed is:

1. An elevator system, comprising:

an elevator car;

an elevator controller configured to control moving of the elevator car along a travel path in a building;

a transferring device to transfer electrical energy and/or information between the elevator car and the elevator controller;

a transmitting device configured to transmit a measurement signal as electromagnetic radiation via an air path;

a detection device arranged in the direction of the air path remote from and opposite the transmitting device, wherein the detection device is configured to receive the measurement signal directly via the air path and to convert it into an electrical signal; and a processing device which is configured to receive the electrical signal, to determine a propagation time of the measurement signal along the air path by means of the electrical signal and to determine a distance between the transmitting device and the detection device by means of the propagation time, wherein the processing device is further configured to determine a position of the elevator car by means of the distance.

2. The elevator system according to claim 1, wherein the transferring device comprises a traveling cable which is used in the elevator system for transferring energy and/or information from and to the elevator car, and wherein the traveling cable has a fixed length.

3. The elevator system according to claim 1, wherein the processing device is arranged at the transmitting device and is coupled to the transferring device by a first interface device to receive the electrical signal via the transferring device.

4. The elevator system according to claim 3, wherein the processing device is configured to determine the propagation time from a difference between a second time at which the processing device receives the electrical signal and a first time at which the transmitting device transmits the measurement signal.

5. The elevator system according to claim 4, wherein the processing device and the transmitting device are temporally synchronized with each other.

6. The elevator system according to claim 1, wherein the processing device is arranged at the detection device and is coupled to the transferring device by a second interface device, wherein the transmitting device is further configured to transmit the measurement signal as an electrical measurement signal to the processing device via the transferring device.

7. The elevator system according to claim 6, wherein the processing device is configured to determine the propagation time from a difference between a second time at which the detection device receives the measurement signal via the air path and a third time at which the processing device receives the electrical measurement signal via the transferring device.

8. The elevator system according to claim 7, wherein the processing device and the detection device are temporally synchronized with respect to each other.

9. The elevator system according to claim 1, wherein the processing device is arranged at the detection device and is coupled to the transferring device by a second interface device, wherein the transmitting device, the processing device and the detection device are temporally synchronized with respect to each other, wherein the synchronization is carried out via the transferring device.

10. The elevator system according to claim 9, wherein the processing device is configured to determine the propagation time from a difference between the second time at which the detection device receives the measurement signal and the first time at which the transmitting device transmits the measurement signal.

11. The elevator system according to claim 1, wherein the transmitting device comprises a laser device, and wherein the detection device comprises a photodetector.

12. The elevator system according to claim 1, wherein the transmitting device is arranged at a fixed location in an elevator shaft and the detection device is arranged on the elevator car, or wherein the detection device is arranged at a fixed location in the elevator shaft and the transmitting device is arranged on the elevator car.

13. A measurement system for an elevator system according to claim 1, wherein the elevator system has an elevator car, an elevator controller and a transferring device to transfer electrical energy and/or information between the elevator car and the elevator controller, the measurement system comprising:

the transmitting device configured to transmit a measurement signal as electromagnetic radiation via an air path;

the detection device positionable in the direction of the air path remote from and opposite to the transmitting device, wherein the detection device is configured to directly receive the measurement signal via the air path and to convert it into an electrical signal; and the processing device which is configured to determine a propagation time of the measurement signal along the air path by means of the electrical signal and to determine a distance between the transmitting device and the elevator car by means of the propagation time, wherein the processing device is further configured to determine a position of the elevator car by means of the distance.

14. A method for determining a distance in an elevator system that has an elevator car, an elevator controller, a transferring device transferring electrical energy and/or information between the elevator car and the elevator controller, a transmitting device, a detection device separated and remotely positioned from the transmitting device by an airway, and a processing device, the method comprising:

activating the transmitting device to emit a measurement signal as electromagnetic radiation;

operating the detection device to convert the electromagnetic radiation into an electrical signal, wherein the electromagnetic radiation propagates directly on the air path from the transmitting device to the detection device; and operating the processing device to receive the electrical signal, to determine a propagation time of the measurement signal over the air path by means of the received electrical signal and to determine a distance between the transmitting device and the elevator car by means of the propagation time, wherein a position of the elevator car is determined by means of the distance.

15. The method according to claim 14, further comprising:

feeding the electrical signal to the processing device via the transferring device wherein the processing device is arranged at the transmitting device and is coupled to the transferring device by a first interface device, and determining the propagation time by means of the processing device from a difference between a second time at which the processing device receives the electrical signal and a first time at which the transmitting device transmits the measurement signal, or transmitting the measurement signal further as an electrical measurement signal by means of the transmitting device, which is coupled to the transferring device by a first interface device, to the processing device via the transferring device, wherein the processing device is arranged at the detection device and is coupled to the transferring device by a second interface device, and determining the propagation time by means of the processing device from a difference between a second time at which the detection device receives the measurement signal via the air path and a third time at which the processing device receives the electrical measurement signal via the transferring device, or temporally synchronizing the transmitting device, the processing device and the detection device, wherein the processing device is arranged at the detection device and is coupled to the transferring device by a second interface device, wherein the synchronization is carried out via the transferring device, and determining the propagation time by the processing device from a difference between the second time at which the detection device receives the measurement signal and the first time at which the transmitting device transmits the measurement signal.

* * * * *